Jan. 17, 1956 E. J. CARSTENS 2,731,161
FORK ATTACHMENT FOR TRACTORS
Filed April 29, 1953 2 Sheets-Sheet 1
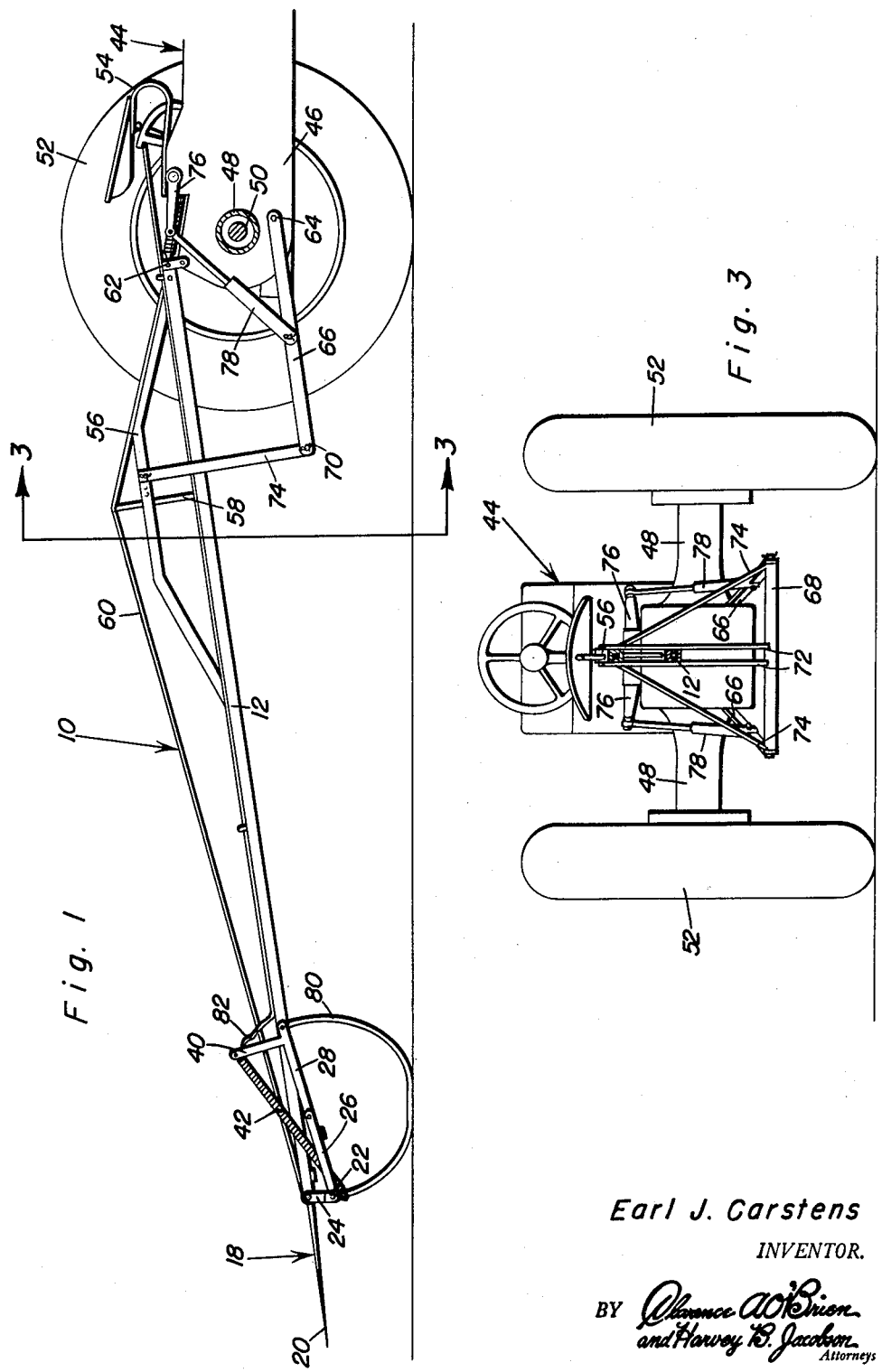
Earl J. Carstens
INVENTOR.

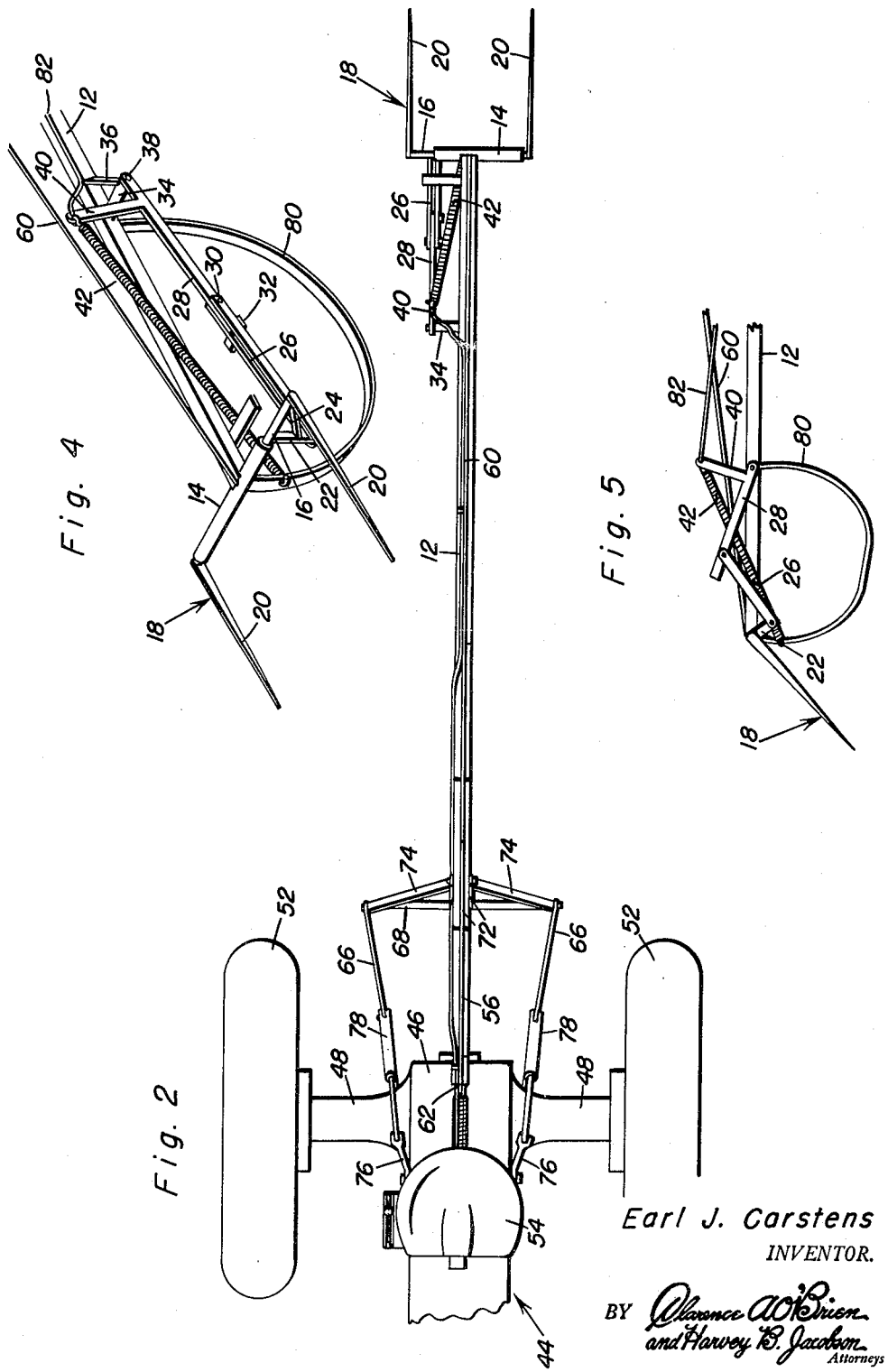

United States Patent Office 2,731,161
Patented Jan. 17, 1956

2,731,161
FORK ATTACHMENT FOR TRACTORS
Earl J. Carstens, Fairbury, Nebr.

Application April 29, 1953, Serial No. 351,969

3 Claims. (Cl. 214—140)

This invention relates in general to fork attachments for tractors, and more specifically to an improved hay bale fork attachment.

It is the primary object of this invention to provide an improved hay bale fork attachment for tractors which may be conveniently secured to tractors for actuation by power lift means thereof, said fork attachment having a fork member at the rear end thereof engageable with a hay bale to facilitate lifting thereof, the fork member being remotely controllable whereby the entire fork attachment may be conveniently operated by an operator of the tractor while seated thereon.

Another object of this invention is to provide an improved fork attachment for tractors which is specifically designed for use in the handling of bales of hay, the fork attachment including a fork member at the rear end thereof, the fork member being positioned relative to the ground for engagement into a center of the hay bale by skid means disposed at the rear end of the fork attachment.

Another object of this invention is to provide an improved fork attachment for tractors which is formed of relatively simple, strong and durable parts which are inexpensive to manufacture so as to be economically feasible.

A further object of this invention is to provide a novel means for controlling actuation of a fork member of a fork attachment for tractors, said actuating means including linkage normally retained in a past center position by spring means and being actuatable from a remote point to a pivoted relationship so as to pivot a fork mounted with respect to an associated supporting boom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the fork attachment which is the subject of this invention and shows the same mounted to a rear portion of a tractor, only the rear portion of the tractor being illustrated and parts thereof being shown in section in order to clearly illustrate the manner in which the fork attachment is attached thereto;

Figure 2 is a rotated top plan view of the rear portion and the fork attachment carried thereby;

Figure 3 is a transverse vertical sectional view taken substantially upon the plane indicated by the section line 3—3 of Figure 1 and shows the general construction of the lifting means at the forward end of the fork attachment;

Figure 4 is an enlarged perspective view of the rear end of the fork attachment and shows the general arrangement and construction of means for selectively actuating a fork member thereof; and Figure 5 is a fragmentary side elevational view of the rear portion of the fork attachment and shows the fork member thereof in a hay bale releasing position.

Referring now to the drawings in detail, it will be seen that the fork attachment, which is the subject of this invention, is referred to in general by the reference numeral 10. The fork attachment 10 includes an elongated boom 12 which has rigidly secured to the rear end thereof a transversely extending sleeve 14. The sleeve 14 is circular in cross section and has pivotally mounted therein a transversely extending shaft 16. The shaft 16 forms a central portion of a fork member which is referred to in general by the reference numeral 18 and has secured to the other ends thereof rearwardly extending tines 20, the tines forming the remainder of the fork member 18.

In order that the tines 20 of the fork member 18 may be retained in longitudinal alignment with the boom 12, there is rigidly secured to the shaft 16 in depending relation a lever 22. The lever 22 is braced relative to the shaft 16 by a brace 24 and prevents transverse shifting of the shaft 16 with respect to the sleeve 14. Pivotally connected to the lower end of the lever 22 is a first link member 26 which is formed of a pair of spaced parallel bars. Pivotally connected to the forward end of the first link member is a second link member 28. The second link member 28 is in the form of a bar which extends between the forward ends of the bars forming the first link member 26. Carried by the first link member 26 on the underside thereof in rearward spaced relation relative to the pivot pin 30 which secures together the first and second links 26 and 28 is a transversely extending stop member 32. It will be understood that the stop member 32 engages the underside of the rear portion of the second link member 28 to limit downward movement of the first and second link members 26 and 28.

Carried by the boom 12 forwardly of the sleeve 14 and projecting to one side thereof is a support 34. The support 34 is braced by a diagonal brace 36 and has pivotally connected thereto by a pivot pin 38 the forward end of the second link member 28.

The forward end portion of the second link member 28 is provided with an upstanding lever 40 which has connected to the upper end thereof an elongated spring 42. The rear end of the spring 42 is connected to a skid which will be described in more detail hereinafter, and urges the lever 40. The rearward urging of the lever 40 results in the positioning of the first and second link members 26 and 28 in past center positions whereby the fork member 18 is retained in longitudinal alignment with the boom 12 against the weight of a hay bale which may be carried thereby (the hay bale not being shown).

Referring now to Figures 1, 2 and 3, it will be seen that there is illustrated a rear portion of the conventional tractor which is referred to in general by the reference numeral 44. The tractor 44 includes a rear frame portion 46 which includes a differential of the tractor and which has extending outwardly therefrom rear axle housings 48. Carried by axles 50 disposed within the rear axle housings 48 are rear wheels 52 also carried by the rear portion of the frame of the tractor 44 is an operator's seat 54.

Referring now to Figure 1 in particular, it will be seen that the forward portion of the boom 12 is strengthened by an angular brace 56 which is disposed in overlying relation to the top of the boom 12 and which is rigidly secured thereto to form in combination therewith a truss. The boom 12 is also braced by an elongated member which extends upwardly and rearwardly from the forward end thereof to an intermediate upstanding strap 58. The member, which is referred to by the reference numeral 60, then extends rearwardly and is connected to the rear end of the boom 12 to form a second truss in combination with the boom 12 to strengthen the same against bending due to a load on the rear end thereof.

In order that the rear end of the boom 12 may be elevated to a desired position to facilitate the unloading of a hay bale which may be carried thereby, the forward end of the boom 12 is pivotally connected as at 62 to an upper hitch connector of the tractor 44. Pivotally connected to lower portions of the frame 46 as at 64 are rearwardly extending links 66. The rear ends of the links 66 are pivotally connected to a transversely extending member 68 as at 70.

As is best illustrated in Figure 3, the transversely extending member 68 has extending upwardly therefrom a pair of spaced parallel supports 72. The supports 72 are disposed on opposite sides of both the forward portion of the boom 12 and the base 56. The supports 72 are also braced by outwardly and inwardly directed diagonal braces 74 whose upper ends are connected to the upper portions of the supports 72 and whose lower ends are pivotally connected to the transversely extending member 68.

The tractor 44 includes a pair of power lift arms 76, one of such power lift arms being disposed on each side of the rear portion of the frame 46. Extending between and pivotally connected to both the power lift arms 76 and intermediate portions of the links 66 are adjustable lifting links 78. It will be seen that when the power lift arms 76 are actuated, the links 66 are pivoted about their pivot points 64 with the result that the rear portion of the boom 12 is either pivoted upwardly or downwardly in a vertical plane.

Carried by the lower end of the boom 12 is a depending skid 80. It will be understood that the skid 80 is intended primarily to retain the fork member 18 in an elevated position with respect to the surface of the ground or any other surface on which a hay bale to be loaded by the fork attachment 10 is positioned. The skid 80 is of a height whereby the tines 20 of the fork member 18 will engage the center of a hay bale to facilitate lifting of the same.

In order that the fork member 18 may be conveniently pivoted to a downwardly directed position, as is best illustrated in Figure 5, to facilitate the removal of a hay bale therefrom, the same is provided with a trip rope 82. The trip rope 82 has its rear end connected to the upper end of the lever 40 and its forward end is conveniently attached to the seat 54 of the tractor 44. After a hay bale (not shown) carried by the fork member 18 has been located in the desired position, the same may be removed from the fork member 18 by pulling upon the trip rope 82. Tensioning of the trip rope 82 will result in forward pivoting of the lever 40 against the resistance of the spring 42. Forward pivoting of the lever 40 will result in upward movement of the rear end of the second link member 28 to the position best illustrated in Figure 5. Upward movement of the rear end of the first link member 26 will result in corresponding upward movement of the forward end of the first link member 26. This in turn will result in downward pivoting of the tines 20 of the fork member 18.

Although the fork member 18 has the tines 20 thereof designed so as to normally cause the falling of a hay bale out of engagement therewith, it will be seen that the skid 80 is so positioned whereby downward movement of the tines 20 will result in the engagement of an associated hay baler (not shown) with an arcuate rear portion of the skid 80 and the resulting urging of the hay bale off of the tines 20. This particular coaction is highly advantageous when the hay is tough and has a tendency to stick to the tines, inasmuch as it eliminates all necessity of an operator of the tractor 44 from leaving the seat 54.

In view of the foregoing, it will be seen that there has been illustrated and described a novel fork attachment for tractors which may be conveniently utilized for the lifting and positioning of hay bales. It will be understood that the fork attachment 10 is not limited to the lifting of hay bales from the ground and the positioning thereon, but is also intended for use in loading trucks and the like.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hay bale fork attachment for tractors comprising an elongated boom having a forward end thereof pivotally securable to a tractor for vertical tilting by power means of the tractor, a skid carried by said boom at a rear end thereof in underlying relation thereto, a fork member pivotally secured to said boom at said rear end thereof, latch means carried by said boom and connected to said fork member for retaining said fork member in a generally horizontal hay bale engaging position, said skid being of a height for retaining said fork member at a hay bale engaging elevation, trip means connected to said latch means for selectively releasing said latch means to facilitate movement of said fork member to a downwardly directed hay bale disengaging position, said skid having a rear portion disposed in partial overlapping relation with said fork member and engageable by a hay bale carried by said fork member in its movement to a bale disengaging position to effect removal of a hay bale from said fork member.

2. A hay bale fork attachment for tractors comprising an elongated boom having a forward end thereof pivotally securable to a tractor for vertical tilting by power means of the tractor, a skid carried by said boom at a rear end thereof in underlying relation thereto, a fork member pivotally secured to said boom at said rear end thereof, latch means carried by said boom and connected to said fork member for retaining said fork member in a generally horizontal hay bale engaging position, said skid being of a height for retaining said fork member at a hay bale engaging elevation, trip means connected to said latch means for selectively releasing said latch means to facilitate movement of said fork member to a downwardly directed hay bale disengaging position, said skid having a rear portion disposed in partial overlapping relation with said fork member and engageable by a hay bale carried by said fork member in its movement to a bale disengaging position to effect removal of a hay bale from said fork member, said latch means including a pair of link members pivotally connected together and retained in past center relation by spring means, said spring returning said link members and said fork member to a bale engaging position after the removal of a hay bale from said fork member.

3. A hay bale fork attachment for tractors comprising an elongated boom having a forward end thereof pivotally securable to a tractor for vertical tilting by power means of the tractor, a skid carried by said boom at a rear end thereof in underlying relation thereto, a fork member pivotally secured to said boom at said rear end thereof, latch means carried by said boom and connected to said fork member for retaining said fork member in a generally horizontal hay bale engaging position, said skid being of a height for retaining said fork member at a hay bale engaging elevation, trip means connected to said latch means for selectively releasing said latch means to facilitate movement of said fork member to a downwardly directed hay bale disengaging position, said skid having a rear portion disposed in partial overlapping relation with said fork member and engageable by a hay bale carried by said fork member in its movement to a bale disengaging position to effect removal of a hay bale from said fork member, said latch means including a pair of link members pivotally connected together and retained in past center relation by spring means, said trip means including a lever carried by one of said link members, said lever being provided with a remotely controllable actuator.

References Cited in the file of this patent

UNITED STATES PATENTS

| | | |
|---|---|---|
| 1,628,725 | Johnson | May 17, 1927 |
| 1,703,600 | Sell | Feb. 26, 1929 |
| 2,397,046 | Richey | Mar. 19, 1946 |
| 2,398,119 | Sauder | Apr. 9, 1946 |
| 2,398,585 | Hayward | Apr. 16, 1946 |
| 2,418,251 | Drott | Apr. 1, 1947 |
| 2,427,575 | Sedore | Sept. 16, 1947 |
| 2,634,003 | Williamson et al. | Apr. 7, 1953 |